(12) United States Patent
Yakura

(10) Patent No.: US 6,938,455 B2
(45) Date of Patent: Sep. 6, 2005

(54) GREASE SUPPLY CONFIRMING DEVICE AND METHOD

(75) Inventor: Kenji Yakura, Kanagawa (JP)

(73) Assignee: NSK Ltd., Tokyo (JP)

( * ) Notice: Subject to any disclaimer, the term of this patent is extended or adjusted under 35 U.S.C. 154(b) by 56 days.

(21) Appl. No.: 10/227,394

(22) Filed: Aug. 26, 2002

(65) Prior Publication Data

US 2003/0037719 A1 Feb. 27, 2003

(30) Foreign Application Priority Data

Aug. 27, 2001 (JP) .................................... 2001-256302

(51) Int. Cl.$^7$ .................. G01F 25/00; G01M 13/04; F01M 1/18; F01M 11/10; F16N 29/04
(52) U.S. Cl. .................. 73/1.36; 73/865.9; 73/1.18; 184/6.4; 184/108; 340/606; 340/682; 222/40
(58) Field of Search .................. 73/865.9, 1.36, 73/1.74, 168, 1.17–1.19, 1.22–1.23; 384/624; 222/40; 184/6.4, 7.4, 8, 108; 324/207.22, 207.24, 207.13; 116/112, 273–274, DIG. 38; 340/681–682, 606, 686.1

(56) References Cited

U.S. PATENT DOCUMENTS

| | | | | |
|---|---|---|---|---|
| 1,151,029 A | * | 8/1915 | McKinley | 116/274 |
| 1,635,040 A | | 7/1927 | Fales | 77/861.53 |
| 1,910,752 A | * | 5/1933 | Coles | 116/273 |
| 2,567,729 A | * | 9/1951 | Rockburg et al. | 366/54 |
| 3,223,198 A | * | 12/1965 | Gruber | 184/7.4 |
| 3,656,140 A | * | 4/1972 | Gruber et al. | 184/6.4 |
| 3,768,510 A | * | 10/1973 | Reves | 222/40 |
| 4,114,560 A | | 9/1978 | Wegmann | 116/272 |
| 4,266,426 A | * | 5/1981 | Gandini | 73/1.22 |
| 4,324,127 A | * | 4/1982 | Gazzara et al. | 73/1.22 |
| 4,417,534 A | * | 11/1983 | Gauch et al. | 116/273 |
| 5,126,722 A | | 6/1992 | Kamis | 184/108 |
| 5,140,862 A | * | 8/1992 | Pappalardo | 73/1.19 |
| 5,456,107 A | * | 10/1995 | Padden et al. | 73/1.19 |
| 6,477,885 B1 | * | 11/2002 | Sekine et al. | 184/6.4 |

FOREIGN PATENT DOCUMENTS

| | | | | |
|---|---|---|---|---|
| DE | 74 11 347 U | | 7/1974 | ........... F16N/28/00 |
| DE | 24 43 610 A1 | | 3/1976 | ............. F17D/3/01 |
| DE | 195 18 869 A1 | | 11/1996 | ............. G01F/1/56 |
| DE | 297 09 860 U1 | | 9/1997 | ............. F17D/3/07 |
| DE | 298 23 702 U1 | | 12/1999 | ........... C01P/13/00 |
| GB | 157 550 | | 1/1921 | |
| JP | 01285682 A | * | 11/1989 | ................. 73/1.19 |
| JP | 2-150566 U | | 12/1990 | |
| JP | 3-172766 A | | 7/1991 | |
| JP | 5-296352 | | 11/1993 | ............ F16J/15/40 |
| JP | 6-28836 | | 4/1994 | ........... B23Q/11/12 |
| JP | 7-29359 | | 7/1995 | |
| JP | 8-21598 A | | 1/1996 | |
| JP | 11-93957 | | 4/1999 | ........... F16C/33/66 |
| JP | 2000205491 A | * | 7/2000 | ........... F16N/11/08 |
| JP | 2000-343024 | | 12/2000 | ........... B05C/11/00 |
| JP | 2001/208290 A | | 8/2001 | |

OTHER PUBLICATIONS

Derwent–Acc–No: 1999–618514, abstract of RU 2113653 C1, Jun. 20, 1998, Bessonov, A. N. et al, "Grease Gun".*
Derwent–Acc–No. 2002–359548, abstract of KR 2001109741 A, Dec. 12, 2001, Kim, C. S., "Device for Injecting Grease".*

* cited by examiner

*Primary Examiner*—Thomas P. Noland
(74) *Attorney, Agent, or Firm*—Sughrue Mion, PLLC

(57) ABSTRACT

A grease supply confirming device confirming the supply of a grease into a bearing, according to the present invention includes a detecting member an elastic supporting member and a movable body. The movable body such as a metal spherical body is movably provided in a piping through which a grease to be supplied flows. The elastic supporting member is provided in the piping for supporting the movable body. The detecting member such as an eddy current type displacement sensor detects to see whether or not the grease is supplied in accordance with the displacement of the movable body. The grease supply confirming device further includes an abnormality judging circuit connected to the detecting member for judging the abnormality in grease supply, and an outputting portion for outputting an alarm according to the instruction from the abnormality judging circuit.

20 Claims, 2 Drawing Sheets

GREASE SUPPLY CONFIRMING DEVICE AND METHOD

BACKGROUND OF THE INVENTION

The present invention relates to a grease supply confirming device and method which can be applied to bearings for use in, e.g., spindle for machine tools that are required to operate at a high rotary speed and have a prolonged life.

Most bearings for the spindle for machine tools and bearings for spindle devices are grease-lubricated for cost reduction or omission of maintenance. In order to meet the requirements for higher productivity, the spindle of machine tools must operate at higher rotary speed. Thus, these bearings have been required to operate at higher rotary speed.

The upper limit of rotary speed of grease-lubricated rolling bearing devices is dmN1,500,000 (dm: pitch diameter (mm); N: shaft rotary speed (rpm)) at maximum.

In order to prevent seizing of bearings, it has been proposed to use a grease supplying device.

In the case where such a grease supplying device is used, it is important to confirm to see whether or not a semi-solid grease is normally supplied into the bearing. This is because the semi-solid grease can block the pipe, preventing the supply of the grease into the bearing. In the case where the bearing operates at a rotary speed as high as greater than dmN 1,500,000, the grease is scattered and then makes little contribution to lubrication. Thus, when the bearing continues to operate at a high rotary speed without the supply of grease, the grease is deteriorated, causing the seizing of the bearing soon.

In order to detect abnormalities such as suspension of grease supply, Japanese Patent Laid-Open No. 1999-93957 discloses a technique involving the use of a piping which is partly transparent so that the flow of grease to be supplied into the bearing can be visually monitored.

In practice, it has been difficult to monitor visually the bearing of spindle for machine tool which operates continuously for a long period of time for the state of grease supply because cost, including labor cost, rises. In actuality, the state of grease supply can be visually confirmed only several times a day, making it impossible to early detect abnormalities such as suspension of supply of grease by the supplier. It has been still disadvantageous in that when the machine tools operate at a rotary speed as high as greater than dmN 1,500,000, the bearing undergoes seizing, making the spindle out of order.

SUMMARY OF THE INVENTION

The invention has been worked out under these circumstances. An aim of the invention is to provide a grease supply confirming device and method which can monitor almost always that the supply of grease into the bearing is certainly effected and thus rapidly detect any abnormality in the supply of grease.

The aforementioned object of the invention can be accomplished with a grease supply confirming device for confirming the supply of a grease into a bearing, comprising:

a movable body movably provided in a piping through which a grease to be supplied flows; and a detecting member for detecting to see whether or not the grease is supplied according to the displacement of the movable body.

Further, the aforementioned object of the invention can also be accomplished with a grease supply confirming method for confirming the supply of a grease into a bearing, comprising the step of:

supporting a movable body movably in a piping through which a grease to be supplied to the bearing flows; and detecting a displacement of the movable body within the piping, to thereby see whether or not the grease is supplied in accordance with the displacement of the movable body.

The above-mentioned grease supply confirming method according to the present invention may further comprises the step of judging an abnormality of the grease supply in the piping with an abnormality judging circuit that is connected to the detecting member.

The above-mentioned grease supply confirming method according to the present invention may further comprises the step of outputting an alarm according to an instruction from the abnormality judging circuit.

In this arrangement, it is made possible to always monitor to see whether or not a grease is certainly supplied into the bearing. Thus, any abnormality in the supply of grease can be rapidly detected, making it possible to prevent the seizing of the bearing remarkably. Accordingly, the life of the bearing which operates grease-lubricated at a high rotary speed can be prolonged. Further, it is not necessary that the operation of the bearing be visually monitored, making it possible to reduce the burden on users and the cost, including labor cost.

In the aforementioned arrangement, the movable body may be supported by an elastic supporting member such as spring provided in a piping. In this arrangement, when the flow of the grease stops, the elastic repulsion of the elastic supporting member, etc. causes the movable body to return to the original position. Thus, the abnormality in the supply of grease can be rapidly detected.

Further, the movable body may be a metal body supported in the piping and the detecting member may be an eddy current type displacement sensor. In this arrangement, the position of the movable body in the grease can be accurately seized.

DETAILED DESCRIPTION OF THE PREFERRED EMBODIMENTS

Embodiments of implementation of the invention will be described in detail in connection with the attached drawings.

Figure 1:
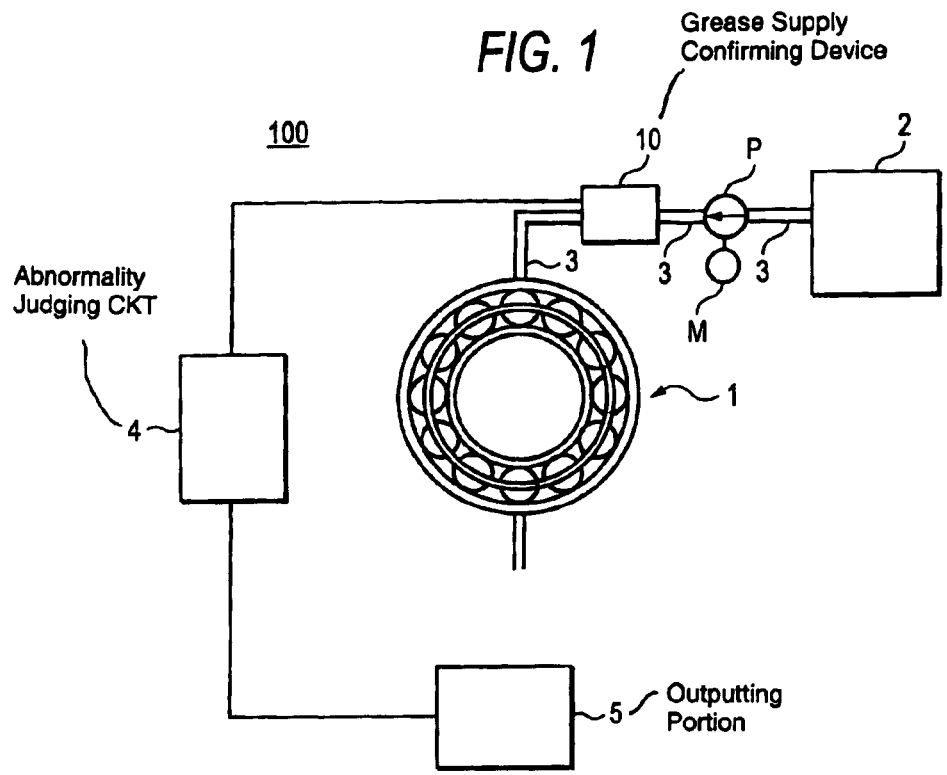
FIG. 1 is an entire sectional view illustrating a grease supplying mechanism comprising the grease supply confirming device of the invention.

FIG. 1 illustrates a grease supplying mechanism 100 comprising a grease supply confirming device 10 as an embodiment of implementation of the invention. The grease supplying mechanism 100 comprises a bearing portion 1, a grease tank 2, a feed pipe 3, a motor M, and a grease supply confirming device 10. The bearing portion 1 rotatably supports a spindle (not shown). The grease tank 2 reserves a grease. The pump P pumps a grease from the grease tank 2 into the bearing portion 1 through the feed pipe 3 that connects between the bearing portion 1 and the pump P. The motor M drives the pump P. The grease supply confirming device 10 confirms the supply of the grease into the bearing portion 1 and is provided at the feed pipe 3. Connected To the grease supply confirming device 10 is an abnormality judging circuit 4 to which an outputting portion 5 is connected. Both the abnormality judging circuit 4 and the outputting portion 5 can be regarded as part of the grease supply confirming device 10.

The grease tank 2 has previously had a proper amount of a grease reserved therein. The grease reserved in the grease tank 2 is introduced into the feed pipe 3 when being driven by the pump P. The feed pipe 3 is connected to the grease tank 2 at one end thereof and to the bearing portion 1 at the other through the pump P and the grease supply confirming device 10.

In the present embodiment, the pump P is driven by the rotation of the motor M. While the pump P is provided in the feed pipe 3 between the grease tank 2 and the grease supply confirming device 10, the disposition of the pump P may be properly changed so far as the grease can be pumped from the feed pipe 3.

The bearing portion 1 is arranged such that the grease is supplied into the interior thereof from the feed pipe 3. For example, the outer ring of the bearing portion 1 may be provided with radially communicating grease supply holes.

Figure 2:
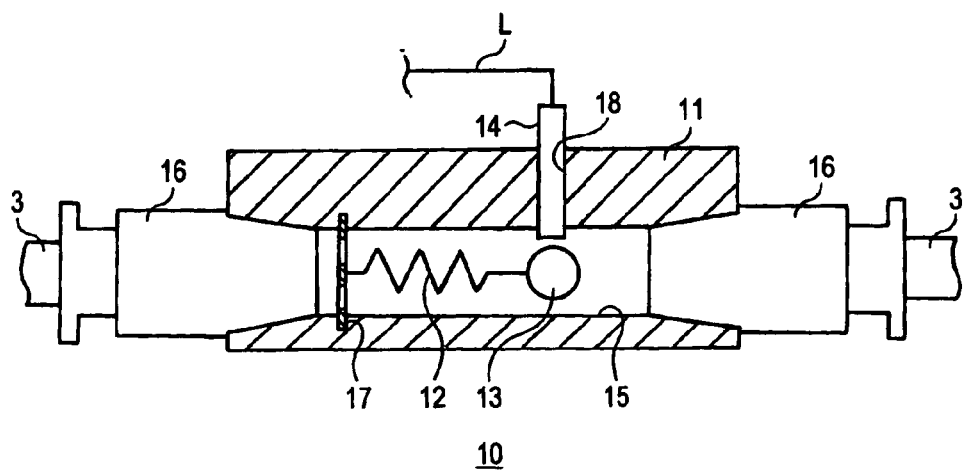
FIG. 2 is a sectional view illustrating the grease supply confirming device of the invention.

FIG. 2 illustrates an entire sectional view of the grease supply confirming device 10 according to the present embodiment.

The grease supply confirming device 10 generally comprises a cylindrical housing 11, a movable body (spherical body made of metal) 13 supported by an elastic supporting member (spring) 12 provided in the housing 11, and a detecting member 14 for detecting the displacement of the spherical body 13. In the present embodiment, as the elastic supporting member 12 there is used a coiled spring (compression spring) and as the detecting member 14 there is used an eddy current type displacement sensor (hereinafter referred to as "displacement sensor").

The housing 11 is connected to the feed pipe 3 upstream (at the side where the grease flows into the housing) and to the feed pipe 3 downstream (at the side where the grease flows out of the housing) through fittings 16. Inside the housing 11 is formed longitudinally a communicating hole 15 which acts as a piping so that the grease can flow from the feed pipe 3 upstream to the feed pipe 3 downstream. In other words, the housing 11 connects between the feed pipe 3 upstream and the feed pipe 3 downstream through the communicating hole 15 provided thereinside.

Inside the communicating hole 15 is provided a spring supporting portion 17. The spring supporting portion 17 may be, e.g., a sheet-like member or net-like member having a grease communicating hole. The spring supporting portion 17 is disposed in the communicating hole 15 perpendicular to the flow of the grease. To the spring supporting portion 17 is attached one end of the coiled spring 12. The other end of the coiled spring 12 is positioned upstream the spring supporting portion 17 to support the spherical body 13.

In the housing 11 is formed a through-hole 18 extending between the outer surface thereof and the communicating hole 15. In the through-hole 18 is fitted the displacement sensor 14 perpendicular to the flow of the grease and opposed to the spherical body 13. A signal line L extends from the displacement sensor 14 on the side thereof opposite the spherical body 13 and is connected to the abnormality judging circuit 4 (see FIG. 1).

FIG. 2 illustrates the state developed when no grease flows through the communicating hole 15 (original state). When the grease flows from upstream to downstream (from right to left as viewed on FIG. 2), the spherical body 13 overcomes the elastic repulsion force of the coiled spring 12 and then displaces from the position shown in FIG. 2 to downstream (to left).

The displacement sensor 14 is arranged to detect the displacement of the spherical body 13 and change its output according to the displacement thus detected. When the output contains any error, the output range can be adjusted.

The output of the displacement sensor 14 is passed to the abnormality judging circuit 4 through the signal line L.

The grease which has flown from upstream then causes the spherical body 13 to move downstream in the communicating hole 15. The spherical body 13 is then energized upstream by the coiled spring 12. Therefore, the spherical body 13 stops moving when it displaces by a predetermined distance from the original position. While the grease flows normally, the spherical body 13 remains at this displacement from the original position.

However, when no grease flows through the communicating hole 15, i.e., the supply of grease is not normally effected, the spherical body 13 doesn't receive the downstream force caused by the grease and thus is pulled back to the original position by the elastic repulsion force of the coiled spring 12.

When the output of the displacement sensor 14 is equal to the output of the displacement sensor 14 developed when the spherical body 13 is positioned at the original position (reference output), the abnormality judging circuit 4 judges that the supply of grease is in an abnormal state. The abnormality judging circuit 4 then gives an instruction to the outputting portion 5 to sound an alarm or suspend the rotation of the spindle.

The reference output may have been previously predetermined to a desired value and be stored as data in a memory portion (not shown) before the operation of the grease supply confirming device 10.

Figure 3:
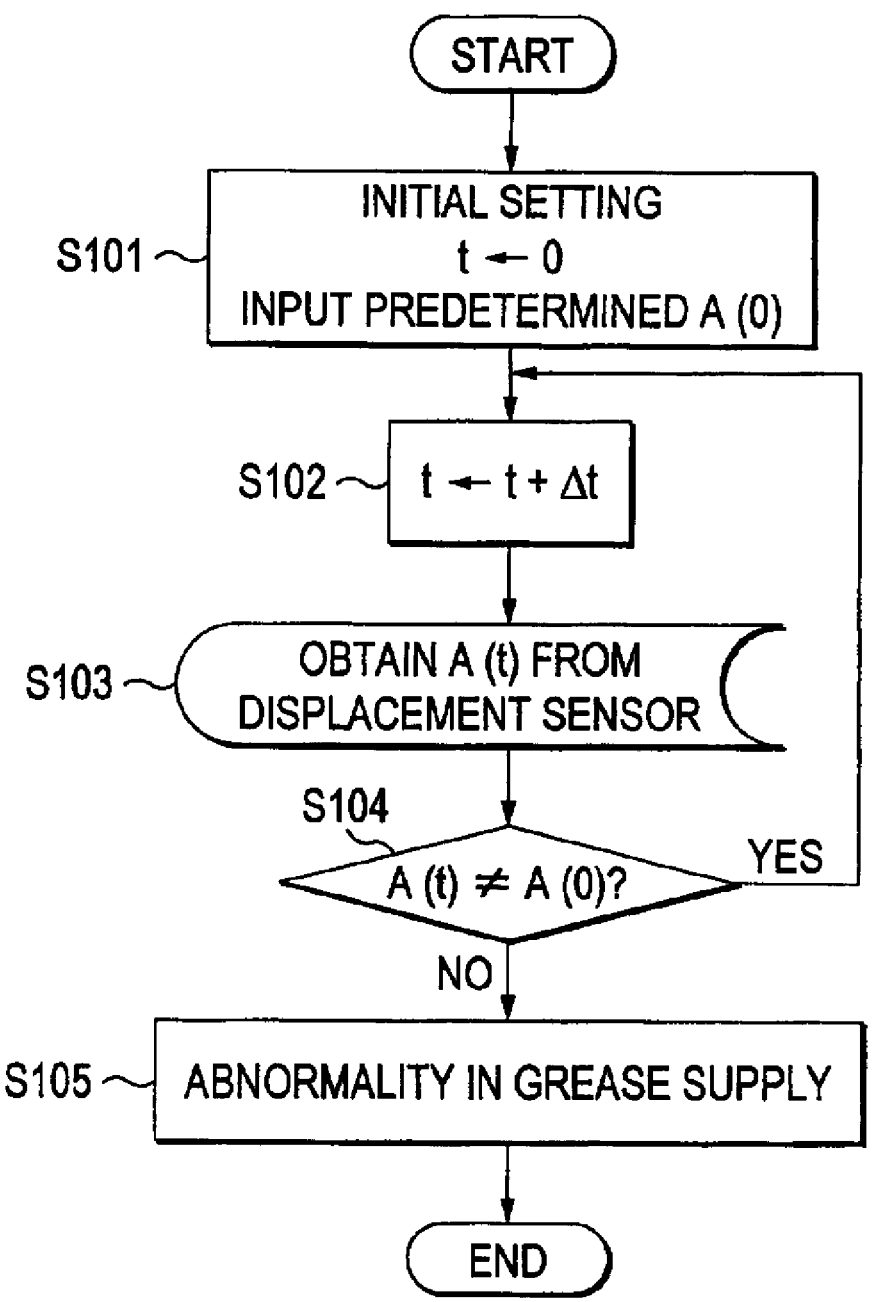
FIG. 3 is a flow chart illustrating the procedure of detection of abnormality in the supply of grease in the abnormality judging circuit.

The procedure of detection of the state of supply of grease in the abnormality judging circuit 4 will be described in connection with a flow chart shown in FIG. 3.

Firstly, a predetermined reference output A(0) is inputted before the beginning of supply (t=0) as an initial setting (Step S101). When a predetermined time Δt passes after the beginning of supply, the predetermined time Δt is then added. The sum is then set as a new time t (Step S102). The output A (t) at the new time t is then collected from the displacement sensor (Step S103).

Subsequently, the output A (t) collected at Step S103 is compared with the reference output A (0) (Step S104). At this point, when the output A (t) doesn't coincide with the reference output A(0), it is judged that the spherical body has displaced from the original position and the supply of grease is normally effected. The procedure proceeds to Step S102. When the predetermined time Δt passes, the procedure then proceeds to Step S103. The procedure then repeats a routine comprising sequence of Step S102, Step S103, Step S104 and back to Step S102 unless the output at time t doesn't coincide with the reference output A (0).

On the other hand, when the output A (t) coincides with the reference output A (0), it is then judged that the spherical body 13 doesn't displace and the grease is not normally supplied (Step S105).

When it is judged by the abnormality judging circuit 4 at Step S105 that the supply of grease is in an abnormal state, the abnormality judging circuit 4 gives an instruction to the outputting portion 5 to sound an alarm or sends a signal to a control portion (not shown) for controlling the rotation of the spindle to suspend (or reduce) the rotation of the spindle.

The detection of displacement of the spherical body may be timed. For example, the detection of displacement of the spherical body may be predetermined such that when the time t exceeds T, which represents detection time, detection is suspended.

The predetermined time Δt doesn't need to be constant as in the present embodiment but may be a variable which changes with time.

The invention is not limited to the aforementioned embodiment but may be properly subjected to change, modification, etc.

The grease supply confirming device can be applied not only to bearing for bearing spindle but also to all bearings.

While the present embodiment has been described with reference to the case where as the detecting member there is used an eddy current type displacement sensor, other detecting members such as non-contact sensor and contact sensor may be used so far as the displacement of the movable body can be detected.

The movable body is not limited to the spherical body made of metal. For example, a movable body made of any material in any shape may be used so far as its displacement can be detected by the detecting member.

The elastic supporting member may be disposed upstream the spherical body.

As mentioned above, the invention can provide a grease supply confirming device which can monitor almost always that the supply of grease into the bearing is certainly effected and thus rapidly detect any abnormality in the supply of grease.

What is claimed is:

1. A grease supply confirming device for confirming the supply of a grease into a bearing, comprising:
    a piping for supplying the grease from a grease tank, which reserves the grease, to the bearing;
    a movable body movably provided in the piping through which a grease to be supplied flows; and
    a detecting member detecting a displacement of the moveable body, wherein the detecting member displaces in accordance with the supply of grease.

2. The grease supply confirming device according to claim 1, further comprising:
    an elastic supporting member provided in the piping for supporting the movable body.

3. The grease supply confirming device according to claim 2, wherein the movable body is a metal spherical body and the elastic supporting member is a coiled spring.

4. The grease supply confirming device according to claim 3, wherein the detecting member is an eddy current type displacement sensor.

5. The grease supply confirming device according to claim 4, further comprising:
    an abnormality judging circuit connected to the detecting member for judging the abnormality in grease supply; and
    an outputting portion for outputting an alarm according to the instruction from the abnormality judging circuit.

6. The grease supply confirming device according to claim 2, wherein the detecting member is an eddy current type displacement sensor.

7. The grease supply confirming device according to claim 2, further comprising:
    a cylindrical housing disposed in the piping, wherein said elastic supporting member is provided in the housing.

8. The grease supply confirming device according to claim 7, wherein the elastic supporting member is a coiled spring, the movable body is a metal spherical body and the detecting member is an eddy current type displacement sensor.

9. The grease supply confirming device according to claim 1, wherein the detecting member is an eddy current type displacement sensor.

10. The grease supply confirming device according to claim 1, further comprising:
    an abnormality judging circuit connected to the detecting member for judging the abnormality in grease supply; and
    an outputting portion for outputting an alarm according to the instruction from the abnormality judging circuit.

11. The grease supply confirming device according to claim 1, wherein said grease supply confirming device is provided in the piping that is a grease feed pipe connecting between the bearing and a pump for pumping the grease from the grease tank to the bearing.

12. The grease supply confirming device according to claim 1, wherein the bearing operates at a rotary speed greater than dm·N 1,500,000, wherein dm is pitch diameter in mm, and wherein N is shaft rotary speed in rpm.

13. A grease supply confirming method for confirming the supply of a grease into a bearing from a grease tank for reserving the grease to the bearing through a piping, by confirming a position of a movable body provided in the piping by the use of a detecting member, the method comprising:
    moving the movable body in the piping in accordance with a flow of the grease in the piping; and
    judging whether the grease is supplied based on a displacement of the movable body.

14. The grease supply confirming method according to claim 13, further comprising:
    judging an abnormality of the grease supply in the piping with an abnormality judging circuit that is connected to the detecting member.

15. The grease supply confirming method according to claim 14, further comprising:
    outputting an alarm according to an instruction from the abnormality judging circuit.

16. The grease supply confirming method according to claim 13, further comprising:
    elastically supporting the movable body with an elastic supporting member that is provided in the piping for supporting the movable body.

17. The grease supply confirming method according to claim 13, further comprising:
    setting a reference output A(0) to an output of the detecting member in accordance with a position of the movable body at the time t=0 before the grease is supplied;
    adding a predetermined time Δt to the time t to set the sum as a new time t when the predetermined time Δt has passed;
    collecting an output A(t) of the detecting member in accordance with the position of the movable body at the new time t;
    comparing the output A(t) and the reference output A(0); and
    judging abnormality of the supply of the grease when the output A(t) coincides with the reference output A(0).

18. The grease supply confirming method according to claim 17, wherein the adding, the collecting, and the comparing are repeated unless the output A(t) coincides with the reference output A(0).

19. A grease supply confirming device for confirming the supply of a grease into a bearing, said grease supply confirming device being provided in a grease feed pipe connecting between a bearing and a pump for pumping the grease from a grease tank reserving the grease therein to the bearing, comprising:

a cylindrical housing through which the grease flows form one end to another end thereof;

an elastic supporting member provided in the housing;

a movable body supported by the elastic supporting member; and a detecting member for detecting the displacement of the movable body, wherein the detecting member detects to see whether or not the grease is supplied in accordance with the displacement of the movable body.

20. The grease supply confirming device according to claim 19, wherein the elastic supporting member is a coiled spring, the movable body is a metal spherical body and the detecting member is an eddy current type displacement sensor.

* * * * *